United States Patent
Chen et al.

(10) Patent No.: US 10,419,758 B2
(45) Date of Patent: Sep. 17, 2019

(54) NON-LOCAL ADAPTIVE LOOP FILTER PROCESSING

(71) Applicant: MEDIATEK INC., Hsinchu (TW)

(72) Inventors: Ching-Yeh Chen, Hsinchu (TW); Tzu Der Chuang, Hsinchu (TW); Chih-Wei Hsu, Hsinchu (TW); Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/918,646

(22) Filed: Mar. 12, 2018

(65) Prior Publication Data

US 2018/0270479 A1 Sep. 20, 2018

Related U.S. Application Data

(60) Provisional application No. 62/472,000, filed on Mar. 16, 2017.

(51) Int. Cl.
*H04N 19/117* (2014.01)
*H04N 19/154* (2014.01)
(Continued)

(52) U.S. Cl.
CPC ......... *H04N 19/117* (2014.11); *H04N 19/119* (2014.11); *H04N 19/14* (2014.11);
(Continued)

(58) Field of Classification Search
CPC .. H04N 19/117; H04N 19/154; H04N 19/182; H04N 19/597; H04N 19/82; H04N 19/119; H04N 19/172
(Continued)

(56) References Cited

U.S. PATENT DOCUMENTS

2007/0217705 A1* 9/2007 Lee .................. H04N 19/86
382/251
2011/0268328 A1 11/2011 Bar-Aviv et al.
(Continued)

FOREIGN PATENT DOCUMENTS

WO WO 2015/172235 A1 11/2015
WO WO 2017/177957 A1 10/2017

OTHER PUBLICATIONS

International Search Report and Written Opinion dated Jun. 5, 2018 in PCT/CN2018/079236.

*Primary Examiner* — Hee-Yong Kim
(74) *Attorney, Agent, or Firm* — Oblon, McClelland, Maier & Neustadt, L.L.P.

(57) ABSTRACT

Aspects of the disclosure provide a method for non-local adaptive loop filtering. The method can include receiving reconstructed picture, dividing the picture into current patches, forming patch groups each including a current patch and a number of reference patches, determining a noise level for each of the patch groups, and denoising the patch groups with a non-local denoising technology. The determining a noise level for each of the patch groups can include calculating a pixel variance for a respective patch group, determining a pixel standard deviation (SD) of the respective patch group according to the calculated pixel variance by searching in a lookup table that indicates mapping relationship between patch group pixel SDs and patch group pixel variances, and calculating a noise level for the respective patch group based on a compression noise model that is a function of the pixel SD.

20 Claims, 7 Drawing Sheets

(51) Int. Cl.
*H04N 19/182* (2014.01)
*H04N 19/172* (2014.01)
*H04N 19/82* (2014.01)
*H04N 19/119* (2014.01)
*H04N 19/597* (2014.01)
*H04N 19/176* (2014.01)
*H04N 19/14* (2014.01)
*H04N 19/17* (2014.01)

(52) U.S. Cl.
CPC ........... *H04N 19/154* (2014.11); *H04N 19/17* (2014.11); *H04N 19/172* (2014.11); *H04N 19/176* (2014.11); *H04N 19/182* (2014.11); *H04N 19/597* (2014.11); *H04N 19/82* (2014.11)

(58) Field of Classification Search
USPC ..................................................... 375/240.03
See application file for complete search history.

(56) References Cited

U.S. PATENT DOCUMENTS

| | | |
|---|---|---|
| 2012/0082244 A1* | 4/2012 | Chen .................... H04N 19/147 375/240.29 |
| 2012/0091340 A1 | 4/2012 | Young |
| 2017/0069059 A1 | 3/2017 | Urfalioglu et al. |
| 2017/0084007 A1 | 3/2017 | Rakhshanfar et al. |
| 2017/0302929 A1 | 10/2017 | Chen et al. |

* cited by examiner

PATCH GROUP PIXEL SD LOOKUP TABLE

| | PIXEL SD | PIXEL VARIANCE | |
|---|---|---|---|
| 521 | 0 | (0+1)/2 = $\frac{1}{2}$ | 511 |
| 522 | 1 | (1^2 + 2^2)/2 = 2$\frac{1}{2}$ | 512 |
| 523 | 2 | (2^2 + 3^2)/2 = 6$\frac{1}{2}$ | 513 |
| 524 | 3 | (3^2 + 4^2)/2 = 12$\frac{1}{2}$ | 514 |
| 525 | 4 | (4^2 + 5^2)/2 = 20$\frac{1}{2}$ | 515 |
| | ⋮ | ⋮ | |
| 526 | 39 | (39^2 + 40^2)/2 = 1560$\frac{1}{2}$ | 516 |
| 527 | 40 | | |

*FIG. 5*

PATCH GROUP PIXEL SD LOOKUP TABLE

| | PIXEL SD | PIXEL VARIANCE | |
|---|---|---|---|
| 621 | $\sqrt{0}$ = 0 | 0 | 611 |
| 622 | $\sqrt{1}$ = 1 | 1 | 612 |
| 623 | $\sqrt{2}$ = 1.4 | 2 | 613 |
| 624 | $\sqrt{3}$ = 1.7 | 3 | 614 |
| 625 | $\sqrt{4}$ = 2 | 4 | 615 |
| | ⋮ | ⋮ | |
| 626 | $\sqrt{1600}$ = 40 | 1600 | 616 |

*FIG. 6*

NON-LOCAL ADAPTIVE LOOP FILTER PROCESSING

INCORPORATION BY REFERENCE

This present disclosure claims the benefit of U.S. Provisional Application No. 62/472,000, "Method of Non-local Adaptive Loop Filter for Video Coding" filed on Mar. 16, 2017, which is incorporated herein by reference in its entirety.

TECHNICAL FIELD

The present disclosure relates to video coding techniques.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Block-based motion compensation, transform, and quantization are broadly employed for video compression to improve performance of video communication systems. However, due to coarse quantization and motion compensation, compression noise can be introduced which causes artifacts, such as blocking, ringing, and blurring in reconstructed pictures. In-loop filters can be employed to reduce the compression noise, which can not only improve quality of decoded pictures, but also provide high quality reference pictures for succeeding pictures to save coding bits. A non-local adaptive loop filter is one type of such in-loop filter.

SUMMARY

Aspects of the disclosure provide a method for non-local adaptive loop filtering. The method can include receiving reconstructed video data corresponding to a picture, dividing the picture into current patches, forming patch groups each including a current patch and a number of reference patches that are similar to the current patch, determining a noise level for each of the patch groups, and denoising the patch groups with a non-local denoising technology to create a filtered picture based on the determined compression noise level of each of the patch groups. The determining a noise level for each of the patch groups can include calculating a pixel variance of pixel values for a respective patch group based on either the pixels in the patch group or the pixels in the current patch of the patch group, determining a pixel standard deviation (SD) of the respective patch group according to the calculated pixel variance for the respective patch group by searching in a first lookup table that indicates mapping relationship between patch group pixel SDs and patch group pixel variances, and calculating a noise level for the respective patch group based on a compression noise model that is a function of the pixel SD of the respective patch group.

In one example, the first lookup table can include a first sequence of patch group pixel SDs, and a second sequence of patch group pixel variances. An average value between square values of each pair of two successive patch group SDs forms the second sequence of patch group variances. In one example, the searching in the first lookup table can include searching for a range defined by two successive average values in the second sequence that includes the pixel variance of the respective patch group, and determining a patch group SD in the first sequence to be the pixel SD of the respective patch group. A square value of the determined patch group SD is included in the same range defined by the two successive average values in the second sequence.

In one example, constructing of the first lookup table can include determining a range of the first sequence of patch group SDs, determining a precision of the first sequence of patch group SDs, and determining the first sequence of patch group SDs according to the determined range and precision.

In an embodiment, the first lookup table includes a first sequence of patch group SDs, and a second sequence of patch group variances. Each of the first sequence of patch group SDs is an SD of one of the second sequence of patch group variances. The searching in the first lookup table can include finding a patch group variance in the second sequence that is equal to the pixel variance of the respective patch group, and determining one of the first sequence of patch group SDs corresponding to the found patch group variance of the second sequence to be the pixel SD of the respective patch group.

In various examples, the non-local denoising technology can be one of a non-local means (NLM) denoising technology, a block matching and 3D filtering (BM3D) denoising technology, or a low-rank approximation (LRA) denoising technology.

In one embodiment, the denoising the patch groups with the non-local denoising technology to create the filtered picture can include calculating an ASSE/Var value to be used for calculating a weighting factor of a reference patch with respect to a current patch, ASSE being an average of a sum of square errors between the reference patch and the current patch, Var being a noise variance that is a square of a noise level of a patch group that includes the reference patch and the current patch. The calculating the ASSE/Var value can include right shifting the Var by $N_x$ bits to locate K number of most significant bits (K-MSBs), K being a preconfigured number, determining a value of $2^M$/K-MSBs by searching a second lookup table based on the located K-MSBs, M being a preconfigured number, right shifting the ASSE by $N_x$ bits, multiplying the right-shifted ASSE with the determined value of $2^M$/K-MSBs to obtain a product, and right shifting the product by M bits to obtain the ASSE/Var value.

In one example, the second lookup table indicates mapping relationship between a sequence of values of $2^M$/K-MSBs and a sequence of K-MSBs each having K number of bits.

Embodiments of the method can further include one of adding a rounding offset to the Var before right shifting the Var by $N_x$ bits, adding a rounding offset to the ASSE before right shifting the ASSE by $N_x$ bits, and adding a rounding offset to the product before right shifting the product by M bits.

In an embodiment, the denoising the patch groups with the non-local denoising technology to create the filtered picture can include calculating a normalized pixel value corresponding to an accumulated pixel value $X_A$ that includes multiple portions of pixel values, each of the portions corresponding to an original pixel value of the divided picture multiplied by a gain. The calculating the normalized pixel value can include (a) right shifting a sum of the gains, $S_G$, corresponding to the accumulated pixel value $X_A$ by $N_x$ bits to locate K number of most significant bits (K-MSBs), K being a preconfigured number, (b) determining a value of 2^M/K-MSBs by searching a third lookup table based on the located K-MSBs, M being a preconfigured number, (c) right shifting the $X_A$ by $N_x$ bits, (d) multiplying the right-shifted $X_A$ with the determined value of 2^M/K-MSBs to obtain a product, and (e) right shifting the product by M bits to obtain a first normalized pixel value.

In one example, the third lookup table indicates mapping relationship between a sequence of values of 2^M/K-MSBs and a sequence of MSBs each having K number of bits.

In an embodiment, the calculating the normalized pixel value can further include performing steps of (a)-(e) with a rounding offset operation to obtain a second normalized pixel value, and averaging the first and second normalized pixel values to obtain the calculated normalized pixel value. The rounding offset operation can include at least one of adding a rounding offset to the $S_G$ before right shifting the $S_G$ by $N_x$ bits, adding a rounding offset to the $X_A$ before right shifting the $X_A$ by $N_x$ bits, or adding a rounding offset to the product before right shifting the product by M bits.

Aspects of the disclosure provide a non-local adaptive loop filter. The non-local adaptive loop filter can include circuitry configured to receive reconstructed video data corresponding to a picture, divide the picture into current patches, form patch groups each including a current patch and a number of reference patches that are similar to the current patch, determine a noise level for each of the patch groups, and denoise the patch groups with a non-local denoising technology to create a filtered picture based on the determined compression noise level of each of the patch groups. The determining the noise level can include calculating a pixel variance of pixel values for a respective patch group based on either the pixels in the patch group or the pixels in the current patch of the patch group, determining a pixel standard deviation (SD) of the respective patch group according to the calculated pixel variance for the respective patch group by searching in a first lookup table that indicates mapping relationship between patch group pixel SDs and patch group pixel variances, and calculating a noise level for the respective patch group based on a compression noise model that is a function of the pixel SD of the respective patch group.

Aspects of the disclosure provide a non-volatile computer readable medium storing instructions implementing the method for non-local adaptive loop filtering.

BRIEF DESCRIPTION OF THE DRAWINGS

Various embodiments of this disclosure that are proposed as examples will be described in detail with reference to the following figures, wherein like numerals reference like elements, and wherein:

FIG. 5 shows a first example patch group pixel standard deviation (SD) lookup table according to an embodiment of the disclosure;

FIG. 6 shows a second example patch group pixel SD lookup table according to an embodiment of the disclosure;

DETAILED DESCRIPTION OF EMBODIMENTS

I. Non-Local Adaptive Loop Filters

Figure 1:
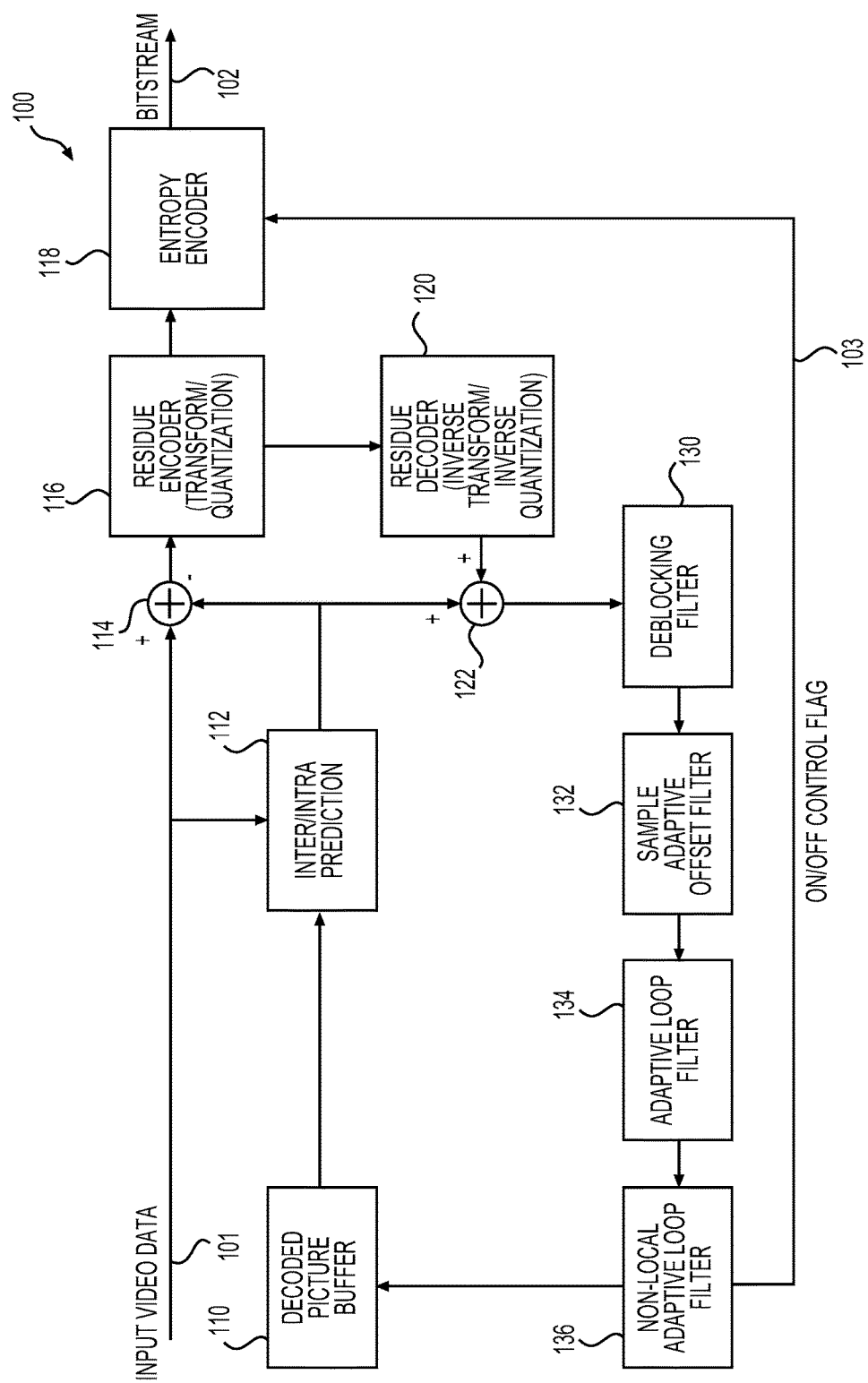
FIG. 1 shows a video encoder according to an embodiment of the disclosure.

FIG. 1 shows an encoder 100 according to an embodiment of the disclosure. The encoder 100 can include a decoded picture buffer 110, an inter-intra prediction module 112, a first adder 114, a residue encoder 116, an entropy encoder 118, a residue decoder 120, a second adder 122, and one or more in-loop filters, such as a deblocking filter (DF) 130, a sample adaptive offset filter (SAO) 132, an adaptive loop filter (ALF) 134, and a non-local adaptive loop filter (NL-ALF) 136. Those components can be coupled together as shown in FIG. 1.

The encoder 100 receives input video data 101 and performs a video compression process to generate a bitstream 102 as an output. The input video data 101 can include a sequence of pictures. Each picture can include one or more color components, such as a luma component or a chroma component. The bitstream 102 can have a format compliant with a video coding standard, such as the Advanced Video Coding (AVC) standards, High Efficiency Video Coding (HEVC) standards, and the like.

According to an aspect of the disclosure, the NL-ALF 136 can employ non-local denoising techniques to improve the performance of the encoder 100. Specifically, in one example, the NL-ALF 136 can divide a reconstructed picture into a plurality of patches (referred to as current patches). For each current patch, the NL-ALF 136 searches for similar patches (referred to as reference patches) in the reconstructed picture to form a patch group. Subsequently, the NL-ALF 136 can apply a denoising technology to each patch group to modify pixel values of one or more patches in respective patch group to reduce compression noise in those patches. The modified pixel values are returned to the picture to form a filtered picture.

In addition, when applying a denoising technology to process each patch group, the NL-ALF 136 can employ certain techniques to lower computational complexity and simplify respective processing operations. For example, square root or division operations can be transformed to lookup table searching, bit shifting, multiplication operations, and the like. As a result, implementation cost of the NL-ALF 136 can be reduced, and performance of the NL-ALF 136 can be improved.

Further, according to an aspect of the disclosure, it cannot be guaranteed that a processed pixel in the filtered picture is better in terms of noise level than a corresponding unfiltered pixel in the reconstructed picture. Accordingly, the NL-ALF 136 can adaptively determine for different blocks (regions) in the picture whether a block would adopt the processed pixel values or retain the unfiltered pixel values of the reconstructed video data. An on/off control flag can be employed for signaling the adaptive adoption of the processed pixel values in a respective block.

In FIG. 1, the decoded picture buffer 110 stores reference pictures for motion estimation and motion compensation performed at the inter-intra prediction module 112. The inter-intra prediction module 112 performs inter picture prediction or intra picture prediction to determine a prediction (or, a predictor) for a block of a current picture during the video compression process. A current picture refers to a picture in the input video data 101 that is being processed in the inter-intra prediction module 112. The current picture can be divided into multiple blocks with a same or different size for the inter or intra prediction operations.

In one example, the inter-intra prediction module 112 processes a block using either inter picture coding techniques or intra picture coding techniques. Accordingly, a block encoded using inter picture coding is referred to as an inter coded block, while a block encoded using intra picture coding is referred to as an intra coded block. The inter picture coding techniques use the reference pictures to obtain a prediction of a currently being processed block (referred to as a current block). For example, when encoding a current block with inter picture coding techniques, motion estimation can be performed to search for a matched region in the reference pictures. The matched region is used as a prediction of the current block. In contrast, the intra picture coding techniques employ neighboring pixels of a current block to generate a prediction of the current block. The neighboring pixels and the current block are within a same picture. The predictions of blocks are provided to the first and second adders 114 and 122.

The first adder 114 receives a prediction of a block from the inter-intra prediction module 112 and original pixels of the block from the input video data 101. The adder 114 then subtracts the prediction from the original pixel values of the block to obtain a residue of the block. The residue of the block is transmitted to the residue encoder 116.

The residue encoder 116 receives residues of blocks, and compresses the residues to generate compressed residues. For example, the residue encoder 116 may first apply a transform, such as a discrete cosine transform (DCT), wavelet transform, and the like, to received residues corresponding to a transform block and generate transform coefficients of the transform block. Partition of a picture into transform blocks can be the same as or different from partition of the picture into prediction blocks for inter-intra prediction processing.

Subsequently, the residue encoder 116 can quantize the coefficients to compress the residues. The quantization can be controlled with a quantization parameter (QP). A QP indicates a step size for associating the transform coefficients with a finite set of steps. A larger QP value represents bigger steps that crudely approximate the transform such that most of signals in the transform block can be captured by fewer coefficients. In contrast, a smaller QP value can more accurately approximate the transform, however, at a cost of increased bit number for encoding the residues. Accordingly, a larger QP can induce more distortion or compression noise into a picture resulted from the video compression process. The compressed residues (quantized transform coefficients) are transmitted to the residue decoder 120 and the entropy encoder 118.

The residue decoder 120 receives the compressed residues and performs an inverse process of the quantization and transformation operations performed at the residue encoder 116 to reconstruct residues of a transform block. Due to the quantization operation, the reconstructed residues are similar to the original resides generated from the adder 114 but typically are not the same as the original version.

The second adder 122 receives predictions of blocks from the inter-intra prediction module 112 and reconstructed residues of transform blocks from the residue decoder 120. The second adder 122 subsequently combines the reconstructed residues with the received predictions corresponding to a same region in the picture to generate reconstructed video data. The reconstructed video data can then, for example, be transferred to the DF 130.

In one example, the DF 130 applies a set of low-pass filters to block boundaries to reduce blocking artifacts. The filters can be applied based on characteristics of reconstructed samples on both sides of block boundaries in a reconstructed picture as well as prediction parameters (coding modes or motion vectors) determined at the inter-intra prediction module 112. The deblocked reconstructed video data can then be provided to the SAO 132. In one example, the SAO 132 receives the deblocked reconstructed video data and categorizes pixels in the reconstructed video data into groups. The SAO 132 can then determine an intensity shift (offset value) for each group to compensate intensity shifts of each group. The shifted reconstructed video data can then be provided from the SAO 132 to the ALF 134. In one example, the ALF 134 is configured to apply a filter to reconstructed video data to reduce coding artifacts in the temporal domain. For example, the ALF 134 selects a filter from a set of filter candidates and applies the elected filter to a region of the reconstructed video data. In addition, the ALF 134 can be selectively turned on or off for each block of the reconstructed video data. The processed reconstructed video data can then be transmitted to the NL-ALF 136.

As described above, the NL-ALF 136 can process the received reconstructed video data using non-local denoising techniques to reduce compression noise in the reconstructed video data. In addition, the NL-ALF 136 can determine whether the non-local adaptive filtering is applied for a block in a denoised picture. For example, the NL-ALF 136 processes the received reconstructed video data and generates filtered video data. The NL-ALF 136 can then compare a filtered block of the filtered video data with a corresponding block of the received reconstructed video data to determine whether a distortion of the filtered block with respect to an original picture has been improved. When the distortion of the filtered block is improved, the pixel values of this filtered block can be adopted for forming the denoised picture. Otherwise, the pixel values of the corresponding block of the received reconstructed video data are adopted in the denoised picture. Accordingly, the denoised picture can be constructed based on the decision of whether to adopt filtered pixel values for a respective block in the denoised picture. The denoised picture can then be stored to the decoded picture buffer 110.

An on/off control flag can be employed to signal the above decision for the respective block to a decoder such that the decoder can process the block in the same way. As shown in FIG. 1, on/off control flags 103 indicating whether non-local adaptive loop filtering is applied to respective blocks are transmitted to the entropy encoder 118 in one example.

The entropy encoder 118 receives the compressed residues from the residue encoder 116 and on/off control flags 103 from the NL-ALF 136. The entropy encoder 118 may also receive other parameters and/or control information, such as intra prediction mode information, motion information, quantization parameters, and the like. The entropy encoder 118 encodes the received parameters or other information to form the bitstream 102. The bitstream 102 including data in a compressed format can be transmitted to a decoder via a communication network, or transmitted to a storage device (e.g., a non-transitory computer-readable medium) where video data carried by the bitstream 102 can be stored.

Figure 2:
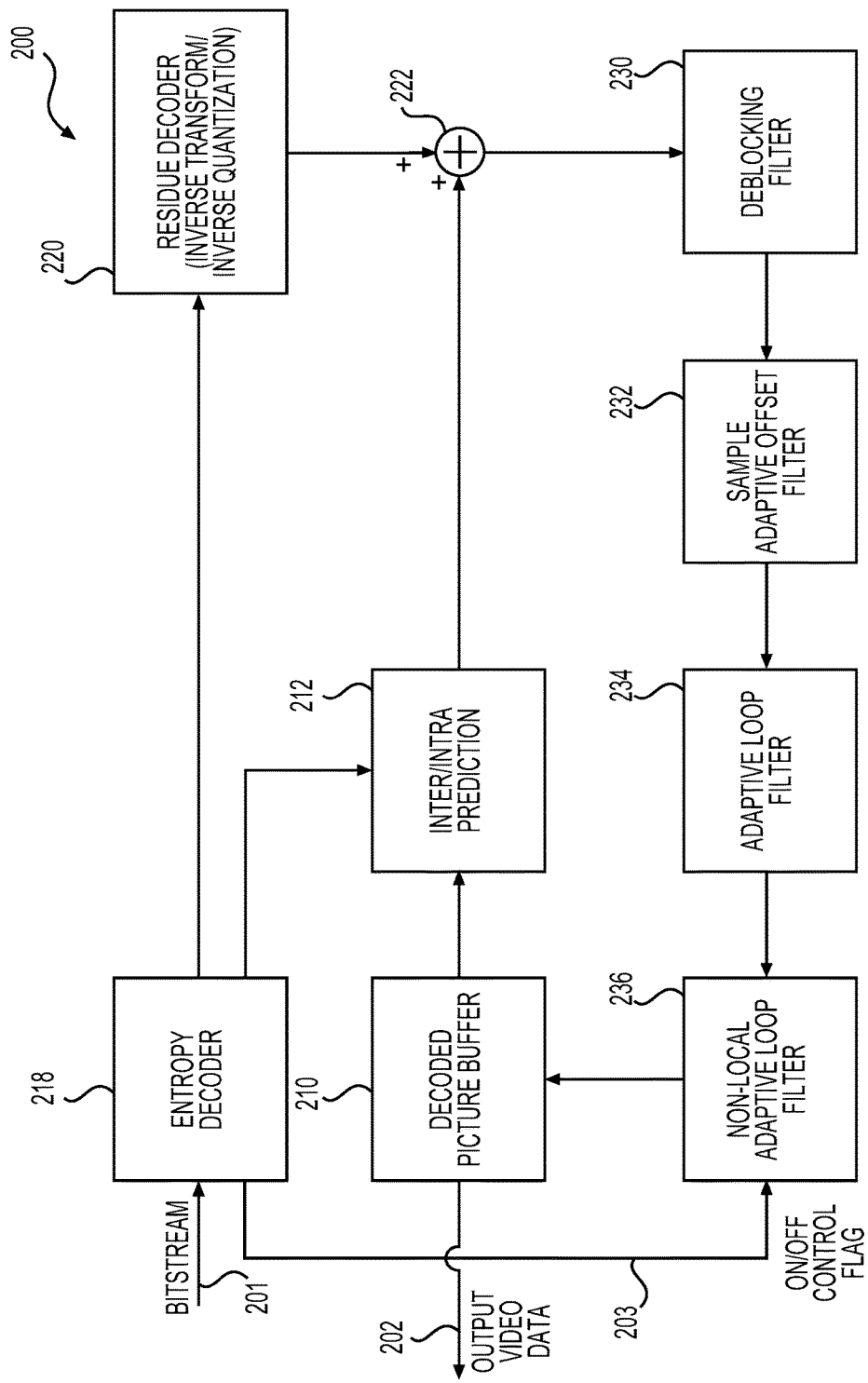
FIG. 2 shows a video decoder according to an embodiment of the disclosure.

FIG. 2 shows a decoder 200 according to an embodiment of the disclosure. The decoder 200 includes an entropy decoder 218, a residue decoder 220, a decoded picture buffer 210, an inter-intra prediction module 212, an adder 222, and one or more in-loop filters, such as a DF 230, an SAO 232, an ALF 234, and a NL-ALF 236. Those components are coupled together as shown in FIG. 2. In one example, the decoder 200 receives a bitstream 201 generated by an encoder, such as the bitstream 102 generated by the encoder 100, and performs a decompression process to generate output video data 202. The output video data 202 can include a sequence of pictures that can be displayed, for example, on a display device, such as a monitor, a touch screen, and the like.

Similar to the encoder 100 in FIG. 1 example, the decoder 200 employs the NL-ALF 236, which has a similar function as the NL-ALF 136, to denoise a reconstructed picture to obtain a filtered picture. For example, when applying a denoising technology to process each patch group, the NL-ALF 236 can employ certain techniques to lower computational complexity and simplify respective processing operations. As a result, implementation cost of the NL-ALF 236 can be reduced, and performance of the NL-ALF 236 can be improved. However, different from the NL-ALF 136 in FIG. 1 example, the NL-ALF 236 receives on/off control flags 203 from the bitstream 201, and accordingly determines which blocks of pixel values in the filtered picture are to be included or excluded in a denoised picture. For example, when a control flag 203 of a block is in a state of on, filtered pixel values of the block in the filtered picture are adopted to the corresponding block of the denoised picture, while when a control flag 203 of a block is in a state of off, pixel values of the block of in the reconstructed picture are adopted.

The entropy decoder 218 receives the bitstream 201 and performs a decoding process which is an inverse process of the encoding process performed by the entropy encoder 118 in FIG. 1 example. As a result, compressed residues, prediction parameters, on/off control flags 203, and the like, are obtained. The compressed resides are provided to the residue decoder 220, and the prediction parameters are provided to the inter-intra prediction module 212. The inter-intra prediction module 212 generates predictions of blocks of a picture based on the received prediction parameters, and provides the predictions to the adder 222. The decoded picture buffer 210 stores reference pictures useful for motion compensation performed at the inter-intra prediction module 212. The reference pictures, for example, can be received from the NL-ALF 236. In addition, reference pictures are obtained from the decoded picture buffer 210 and included in the picture video data 202 for displaying to a display device.

The residue decoder 220, the adder 222, the DF 230, the SAO 232, and the ALF 234 are similar to the residue decoder 120, the second adder 122, the DF 130, the SAO 132, and the ALF 134 in terms of functions and structures. Description of those components is omitted.

The employment of a non-local adaptive loop filter, such as the NL-ALFs 136 and 236, in a decoder or encoder reduces a noise level in reconstructed video data, resulting in high quality output pictures. In addition, when those high quality pictures are used as reference pictures for encoding succeeding pictures, bit rate for transmission of the compressed pictures can be decreased. Therefore, denoising techniques disclosed herein for improving performance of a NL-ALF can improve performance and capability of a decoder or encoder which includes the NL-ALF.

While the FIG. 1 and FIG. 2 examples show a series of filters 130, 132, and 134, or 230, 232, and 234, that are included in the encoder 100 or decoder 200, it should be understood that none or fewer of such filters can be included in an encoder or decoder in other embodiments. In addition, the position of the NL-ALF 136 or 236 with respect to other filters can be different from what is shown in the FIG. 1 or FIG. 2 examples. For example, the NL-ALF 136 can be arranged in front of other filters so that it is directly coupled to the adder 122, or at the end of the series of filters, or among the series of filters.

In various embodiments, the NL-ALFs 136 and 236 can be implemented with hardware, software, or combination thereof. For example, the NL-ALF 136 or 236 can be implemented with one or more integrated circuits (ICs), such as an application specific integrated circuit (ASIC), field programmable gate array (FPGA), and the like. For another example, the NL-ALF 136 or 236 can be implemented as software or firmware including instructions stored in a computer readable non-volatile storage media. The instructions, when executed by a processing circuit, causing the processing circuit to perform functions of the NL-ALF 136 or 236.

It is noted that the NL-ALFs 136 and 236 implementing the denoising techniques disclosed herein can be included in other decoders or encoders that may have similar or different structures from what is shown in FIG. 1 or FIG. 2. In addition, the encoder 100 and decoder 200 can be included in a same device, or separate devices in various examples.

II. Non-Local Denoising Technologies

Figure 3:
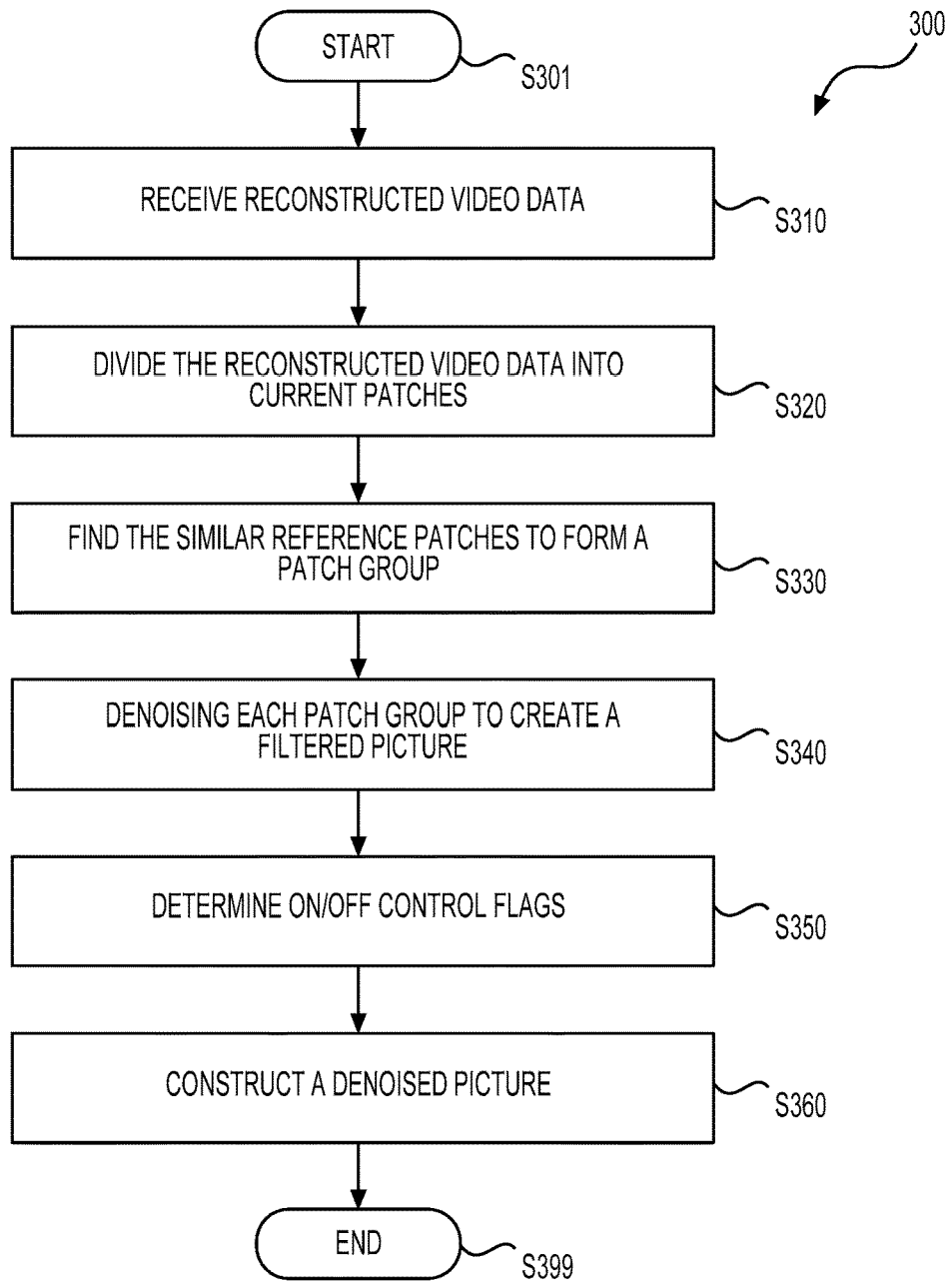
FIG. 3 shows a process for denoising a reconstructed picture according to an embodiment of the disclosure.

FIG. 3 shows a process 300 for denoising a reconstructed picture according to an embodiment of the disclosure. The process 300 can be performed at the NL-ALF 136 or 236 in the FIG. 1 or FIG. 2 example, and the FIG. 1 example is used to explain the process 300.

The process 300 starts from S301 and proceeds to S310. At S310, reconstructed video data is received at the NL-ALF 136. For example, the second adder 122 receives predictions from the inter-intra prediction module 122, and residues from the residue decoder 120, and combines the predictions and residues to generate reconstructed video data. In various embodiments of the process 300, the reconstructed video data can correspond to a picture, a frame, a slice of a picture, or a predefined region of a picture. Accordingly, a picture or a reconstructed picture corresponding to the reconstructed video data, can refer to a picture, a frame, a slice of a picture, or a predefined region of a picture, and the like, in this disclosure. In addition, a filtered picture, or a denoised picture resultant from a picture corresponding to reconstructed video data can accordingly refer to a picture, a frame, a slice of a picture, or a predefined region of a picture, and the like in this disclosure. Depending on a number of in-loop filters employed and a position of the NL-ALF 136 among those in-loop filters, the reconstructed video data can correspond to reconstructed video data generated from the residue decoder 120, or filtered reconstructed video data generated from a filter adjacent and previous to the NL-ALF 136.

At S320, the received reconstructed video data (corresponding to the reconstructed picture) is divided into a plurality of patches. In one example, the patches have a same size and shape, and are non-overlapped with each other. In other examples, the patches may have different sizes or shapes. In further examples, the patches may overlap with each other. Each patch includes a plurality of pixels, and is referred to as a current patch.

At S330, for each current patch, a plurality of similar patches (referred to as reference patches) are found in the reconstructed picture, or in some examples, in a search window within the reconstructed picture. In one example, each reference patch has a similar shape and size as the respective current patch. In addition, the reference patches can overlap each other, and the reference patches and the respective current patch can overlap each other. Each current patch and the respective similar reference patches form a patch group. In one example, for each current patch, the K most similar patches are found, and the current patch and the respective K most similar patches form a patch group including K+1 patches. K indicates a number of similar patches corresponding to a current patch, and K can have different values for different current patches or patch groups. In one example, similar matches found for a respective current patch are not the most similar reference patches but reference patches having a similarity measure above a threshold. The similarity measure can be obtained based on a similarity metric. In one example, patch groups are formed for a portion of the current patches instead of for each current patch.

In various embodiments, various search methods can be used to search for the K most similar reference patches for a respective current patch. In addition, in various embodiments, various similarity metrics can be used to measure the similarity between a current patch and a reference patch. For example, the similarity metric can be a sum of absolute differences (SAD), or a sum of square differences (SSD), between corresponding pixel values in a current patch and a corresponding reference patch. For another example, pixel values in a current patch and a corresponding reference patch can be arranged as two vectors, and a L2 norm distance between those two vectors can be used as a similarity metric.

At S340, a denoising technology is applied to each patch group to modify pixel values of one or more patches in the respective patch group. Particularly, when applying the denoising technology to process a patch group, the NL-ALF 136 can employ certain techniques to lower computational complexity and simplify respective processing operations. For example, square root or division operations can be transformed to lookup table searching, bit shifting, and/or multiplication operations.

The modified pixel values of different patches either belonging to a same patch group or different patch groups are then aggregated to form a filtered picture, for example, by operations of weighted sum. In various embodiments, various denoising technologies can be employed to process the patch groups. For example, the denoising technology can be a non-local means (NLM) denoising technology, a block matching and 3D filtering (BM3D) denoising technology, or a low-rank approximation (LRA) denoising technology. However, the denoising technology applicable for processing the patch groups are not limited to the NLM, BM3D, or LRA technologies.

At S350, on/off control flags associated with a control block in a denoised picture are determined in a manner as described above. The on/off control flags indicate whether the control block adopts filtered pixel values in the filtered picture or pixel values of the reconstructed picture corresponding to the received reconstructed video data. The on/off control flags can be signaled from an encoder to a decoder. That is, the encoder determines the values of the on/off control flags and incorporates the on/off control flags with the determined values in the bitstream, so that the decoder parses the on/off control flags from the bitstream to determine the values of the on/off control flags. In various embodiments, control blocks for control of whether to adopt filtered pixel values resultant from the denoising operations at S340 can be defined or partitioned in various ways. For example, a partition of the control blocks can be consistent with a partition of coding units defined in the HEVC standard. Or, a partition of the control blocks can be consistent with a block partition used in a filter, such as the DF 130, the SAO 132, or the ALF 134, for purpose of control a filtering operation. Alternatively, the control block partition can be determined according to noise characteristics of different regions in a picture. In various examples, the control block partition information can be signaled from an encoder to a decoder, derived at a decoder, or predefined as a default configuration at both an encoder and a decoder.

At S360, the denoised picture are constructed based on the on/off control flag decisions. For control blocks associated with an on flag, filtered pixel values resultant from the denoising operation as S340 are adopted for the respective control blocks, while for control blocks associated with an off flag, pixel values of the received reconstructed picture are adopted for the respective control blocks. Subsequently, a reference picture can be generated based on the denoised picture. For example, the denoised picture can be stored to the decoded picture buffer 110 to be used as a reference picture. Alternatively, depending on the position of the NL-ALF 136 among other in-loop filters, the denoised picture may first be processed by other in-loop filters before storing into the decoded picture buffer 110. The process 300 proceeds to S399, and terminates at S399.

Figure 4:
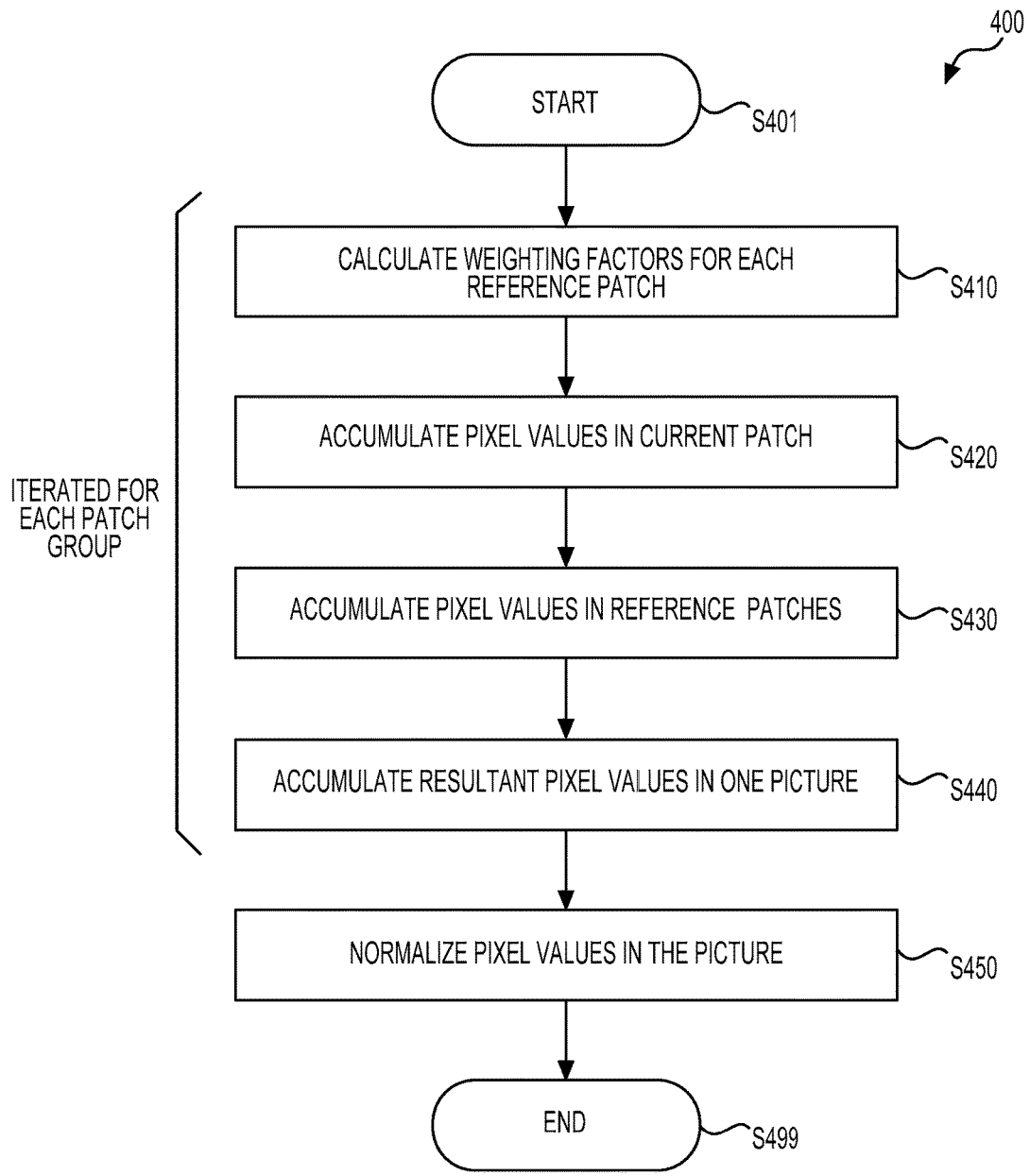
FIG. 4 shows an exemplary process of denoising according to an embodiment of the disclosure.

FIG. 4 shows an exemplary process 400 of denoising according to an embodiment of the disclosure. The denoising in the process 400 employs a denoising technology that is one of the various denoising technologies employed at S340 in the process 300. Accordingly, the process 400 can be performed in place of S340 in the process 300 to obtain a denoised picture. Similarly, for other denoising technologies employed at S340, a process corresponding to the respective denoising technology can be performed in place of S340. The NL-ALF 136 is used as an example to explain the process 400.

The process 400 starts from S401 and proceeds to S410. Before initiation of the process 400, patch groups corresponding to reconstructed video data received at the NL-ALF 136 can have already been formed, for example, by performing the steps of S310-S330 in the process 300. The received reconstructed video data can correspond to a reconstructed picture or a portion of the reconstructed picture (such as a slice of the reconstructed picture). Assume the received reconstructed video data corresponds to a reconstructed picture below. The steps of S410-S440 are iterated for each patch group of the reconstructed picture. During the iteration, a patch group being processed in each round of the iteration is referred to as a current patch group.

At S410, weighting factors for each reference patch in a current patch group are calculated. The weighting factor of a reference patch can be calculated based on a similarity between the reference patch and a respective current patch in the current reference patch group. The more a reference patch is similar to the current patch, the larger the weighting factor of the reference patch. In one example, the weighting factors are determined using the following expression, $$w_{i,j} = e^{-(ASSE/Var)}.$$

In the above expression, i and j are patch indexes, $w_{i,j}$ represents a weighting factor of a reference patch j with respect to the respective current patch i; ASSE represents an average of a sum of square errors between corresponding pixel values in the patches i and j, and indicates the similarity degree between the patches i and j; Var can be defined as a variance of compression noise in the current patch group or a variance of compression noise in the current patch of the current patch group, and Var can be referred to as a noise variance. Therefore, the noise variance Var can be equal to a square of a standard deviation (SD) of compression noise of the current patch group when the definition of the noise variance Var is the variance of compression noise in the current patch group; or the noise variance Var can be equal to a square of a standard deviation (SD) of compression noise of the current patch when the definition of the noise variance Var is the variance of compression noise in the current patch of the current patch group. An SD of compression noise of a current patch group or the current patch can be further referred to as a noise SD of the respective patch group. A noise SD of a patch group indicates a noise level of the respective patch group. Thus, a noise SD of a patch group can be referred to as a noise level of the respective patch group. In addition, the noise variance Var can indicate strength of the filtering operation. The higher the compression noise level, the higher the Var, and the larger the corresponding weighting factors of the current patch group.

In the above example, the weighting factors of each reference patch are derived based on the expression, $e^{-(ASSE/Var)}$. In order to reduce computational cost of calculation a weighting factor of a reference patch, piece-wise linear interpolation is used to approximate the value of the expression, $e^{-(ASSE/Var)}$ in one example. For example, the values of (ASSE/Var) at 6 control points are {0, 0.5, 1.0, 2.0, 4.0, 6.0} and the corresponding weighting factors are {1.0000, 0.6065, 0.3679, 0.1353, 0.0183, 0.0025}. Assuming a current value of (ASSE/Var), $V_C$, has been obtained, two closest control points to the current value $V_C$ can be used to perform a linear interpolation (or extrapolation) to generate a corresponding weighting factor of (ASSE/Var).

At S420, pixel values in the current patch are accumulated. In one example, the accumulation of the current patch pixel values is performed in a way that weighted pixel values of corresponding pixels in each reference patch are aggregated to corresponding pixel values of the current patch based on the respective weighting factors of each reference patch. In one example, the accumulation is performed according to the following expression, $$x_{Ai}(p) = x_i(p) + \Sigma_{j=1}^{K} w_{i,j} y_j(p),$$

where p is a pixel index, $x_{Ai}(p)$ represents an aggregated pixel value of the pixel, p, in the current patch i resultant from the aggregation, $x_i(p)$ represents an original pixel value of the pixel, p, in the current patch i before the aggregation, $y_j(p)$ represents an original pixel value of the pixel, p, in a reference patch j.

At S430, pixel values in each reference patch of the current patch group are accumulated. In one example, the accumulation of pixel values of a reference patch is performed in a way that a weighted pixel value of a corresponding pixel in the current patch are added to a corresponding pixel value of the reference patch based on the weighting factors of the reference patch. In a first example, the accumulation is performed according to the following expression, $$y_{Aj}(p) = w_{i,j} x_{Ai}(p),$$

where p is a pixel index, $y_{Aj}(p)$ represents an aggregated pixel value of the pixel, p, in a reference patch j resultant from the aggregation, $x_{Ai}(p)$ represents the aggregated pixel value of the pixel, p, in the current patch i resultant from the aggregation at S420. In a second example, $x_i(p)$ in the current patch i is used in the above accumulation instead of $x_{Ai}(p)$.

At S440, the accumulated pixel values of the current patch and the reference patches resultant from S420 and S430 are accumulated to corresponding pixels in a picture, referred to as an accumulation picture. As the reference patches and the current patch in the current patch group can overlap each other, a pixel in the accumulation picture may receive pixel values from multiple patches, either the current patch or one or more reference patches. As the steps S410-S440 are performed for each patch group, at S440, accumulated pixel values of the respective current or reference patches of each round of the iteration can be accumulated to the accumulation picture. Accordingly, a pixel in the accumulation picture can receive accumulated pixel values from one or multiple patch groups. As an example, accumulated pixel values, $x_A(p)$, in the accumulation picture can be rewritten as $$x_A(p) = x_i(p) + \Sigma_{i=1}^{m} \Sigma_{j=1}^{K} w_{i,j} y_j(p),$$

where i is the index of patch groups in one picture, and there are total m patch groups in one picture.

At S450, accumulated pixel values in the accumulation picture are normalized to obtain a filtered picture. As a result of S440, an accumulated pixel in the final accumulation picture can include multiple portions of pixel values, and each of the portions corresponds to an original pixel value of either a current patch or a reference patch multiplied by a gain. Each gain corresponds to a weighting factor, or a product of one or more weighting factors. Accordingly, an accumulated pixel in the accumulation picture can be divided by a sum of those gains to obtain a normalized pixel value. Those normalized pixel values form the filtered picture. The process 400 proceeds to S499 and terminates at S499.

As an example, after performance of the process 400, the steps of S350 and S360 in process 300 can be performed to the filtered picture to determine the on/off control flag and construct a denoised picture.

III. Compression Nose Models

In the denoising technology presented in the process 400, the noise variance of compression noise in a current patch group, Var, is used for calculating the respective weighting factors, as shown in the expression, $w_{i,j} = e^{-(ASSE/Var)}$. According to an aspect of the disclosure, the Var can be derived based on a compression noise model. In addition to the denoising technology presented in the process 400, a compression noise model can also be used in other denoising technologies for deriving a variance of compression noise in a patch group, such as the denoising technologies applied at S340 of the process 300 as described above. For example, a compression noise model can be used to derive a threshold for soft-thresholding or hard thresholding in the block matching and 3D filtering (BM3D) denoising technology or the low-ran approximation (LRA) denoising technology. Examples of compression noise models and usage of compression noise models are described below.

Generally, a compression noise model describes relationship between a compression noise level in a patch group and factors that affect the compression noise level. The factors can include characteristics of content of the patch group, coding types associated with the patch group (for example, coded by intra prediction or inter prediction), and transform quantization parameters (QPs) associated with the patch group. A compression noise model can be determined based on experiments. Subsequently, compression noise levels of patch groups can be estimated based on the determined compression noise model during a non-local denoising process for processing a reconstructed picture. In various examples, compression noise models can take different forms, may have different accuracy, and may be formulated differently for different applications.

In one example, a compression noise model used for various denoising technologies is formulated with a polynomial function. For example, the compression noise model takes the following form, $$y=ax^3+bx^2+cx+d,$$

where y represents a noise SD of compression noise of a patch group, which indicates a compression noise level of the patch group and a square of which equals the noise Var of the patch group; x represents a SD of pixel values of the current patch group or the current patch (referred to as a pixel SD) and indicates a characteristic of content of the respective patch group; and the parameters (coefficients), a, b, c, and d, referred to as model parameters, are constants. As an example, during a usage of the compression noise model, the constants, a, b, c, and d, can first be selected from multiple sets of model parameters based on coding type or QP associated with the respective patch group. Then, a pixel SD of pixel values of the current patch group or the current patch, x, can be calculated. Finally, based on the obtained model parameters, a, b, c, and d, and the pixel SD of pixel values, x, a noise SD of compression noise of a patch group can be calculated.

In one example, the candidate sets of model parameters of the compression noise model are determined by conducting an experimental process. For example, common sequences of test pictures can be used in multiple coding processes at an encoder, such as the encoder 100. For each coding process, a set of picture coding type and transform QP can be configured for a sequence of pictures. Corresponding to each set of coding type and transform QP, compression noise and pixel values corresponding to different patch groups in a picture can be obtained. Accordingly, multiple data points of SDs of compression noise and pixel values corresponding to each patch group can be obtained. Based on the multiple data points, a set of model parameters (coefficients) of the compression noise model corresponding to the set of coding type and transform QP can be determined by a regression analysis to the data points. As a result of the above experimental process, multiple sets of model parameters of the compression noise model can be obtained each corresponding to a different set of coding type and transform QP. Table 1 below show an example of candidate sets of model parameters. As shown, a candidate set of model parameters is obtained for each pair of coding type and QP.

TABLE 1

Candidate Sets of Model Parameters

|  | QP 1 | QP 2 | QP 3 |
|---|---|---|---|
| Coding Type I | $\{a, b, c, d\}_1$ | $\{a, b, c, d\}_2$ | $\{a, b, c, d\}_3$ |
| Coding Type II | $\{a, b, c, d\}_4$ | $\{a, b, c, d\}_5$ | $\{a, b, c, d\}_6$ |

In a conventional denoising technology, a power function is used for formulating a compression noise model. In one such example, the compression noise model takes the form of a power function, $y=ax^b$, where y represents a SD of compression noise of a patch group, x represents a SD of pixel values of the patch group, and a and b are model parameters to be selected. According to an aspect of the disclosure, usage of a polynomial function, instead of a power function, to formulate a compression noise model can reduce computation complexity related with the compression noise model.

In one example, clipping operations are applied to the polynomial compression noise model in order to guarantee a monotonic increase property of the polynomial function. For example, a clipping operation can be added to a value of a pixel SD of pixel values of a respective patch group, or a value of a noise SD of compression noise of the respective patch group resultant from the polynomial function.

In a conventional denoising technology, selection of model parameters of a compression noise model is based on picture or slice level information. For example, patch groups formed at steps of S310-S330 are included in a picture or a slice, and accordingly coding types and QPs defined at a picture level or a slice level are utilized to select model parameters of the compression noise model for each patch group without distinguishing different patch groups. However, according to an aspect of the disclosure, compression noise level varies for different regions in a picture according to prediction types, QPs, and predictions of respective regions. Accordingly, different set of model parameters of a compression noise model can be selected for patch groups distributed at different locations within a picture. As a result, noise variances or noise SDs of compression noise of different patch groups can be derived more accurately.

Accordingly, in one example, when selecting model parameters of a compression noise model, coding unit level information is utilized. A coding unit of an encoded picture can include coding data of collocated blocks of multiple color components (such as a luma component, two chroma components). For each color component, the coding unit can include one or more coding blocks and one or more transform blocks. As an example, a usage of coding unit is specified in the HEVC standard. In one example, coding unit level information includes a prediction type and a transform QP that are applied to respective coding blocks or transform blocks, respectively, in the respective coding unit.

In one example, a reconstructed picture or slice includes a plurality of coding units, and coding unit level information including a prediction type and a QP is associated with each respective coding unit. The prediction type information can be used for prediction operations, for example, at the inter-intra prediction module 112 in FIG. 1 and the QP information can be used for quantization operations, for example, at the residue encoder 116. When applying a denoising technology to a current patch group, for example, at S340 in process 300, and calculating a Var of compression noise of the current patch group for obtaining weighting factors, coding unit level information can be used to determine model parameters of a compression noise model. For example, a coding unit has a block (of one color component) that overlaps the current patch of the current patch group (of the same color component) (for example, a top-left pixel of the current patch is within the block of the coding unit), and a prediction type and QP of this coding unit are then used to select a set of model parameters of the compression noise model for the current patch group, for example, from the Table 1.

In addition, in the above example, for scenarios that the coding unit is coded with inter prediction, a state of residues corresponding to the coding unit is also considered for selection of the compression noise model parameters. For example, the QP of the coding unit is used for selection of the model parameters when there is a non-zero residue in the coding unit resultant from a prediction operation, while an average between the QP of the coding unit and one or more QPs of one or more predictions of coding blocks of the corresponding coding unit is used as the QP for selection of the model parameters when there is no residue in the coding unit. In one example, a QP of a prediction corresponding to a coding block in a coding unit is a QP of a coding unit that overlaps the prediction in a reference picture including the prediction. Or in another example, a QP of a prediction corresponding to a coding block in a coding unit is a QP in the slice header of a reference picture.

IV. Techniques for Reducing Computational Complexities

When applying a denoising technology to process each patch group, the NL-ALF 136 or 236 can employ certain techniques to lower computational complexity and simplify respective processing operations. For example, square root or division operations can be transformed to lookup table searching, bit shifting, multiplication operations, and the like. As a result, implementation cost of the NL-ALF 136 or 236 can be reduced, and performance of the NL-ALF 136 or 236 can be improved.

FIG. 5 shows a first example patch group pixel SD lookup table 500 according to an embodiment of the disclosure. As described above, when applying a non-local denoising technology to process a patch group, a noise level of the patch group can be estimated with a compression noise model that is a function of a pixel SD of the respective patch group. To obtain the pixel SD of the patch group, a pixel variance for the patch group can first be calculated based on the pixels in the patch group or the pixels in the current patch of the patch group. Subsequently, a square root operation can be performed to the pixel variance to obtain the pixel SD. For example, the pixel variance for the patch group can be calculated with the following expression, $$\text{Pixel varance} = \frac{1}{n}\sum_{k=1}^{n}(x_k - u)^2,$$

where n represents a number of pixels in a current patch and reference patches in the patch group, x represents a pixel value of the patch group, and u represents an average pixel value of in the patch group. Accordingly, the pixel SD of the patch group can be calculated with the following expression, $$\text{Pixel } SD = \sqrt{\text{Pixel varance}} = \sqrt{\frac{1}{n}\sum_{k=1}^{n}(x_k - u)^2}.$$

In another example, the pixel variance for the patch group is defined as the variance of the current patch instead of the current patch group.

In some examples, the lookup table 500 can be used to replace the square root operation to obtain a pixel SD of a patch group such that respective computations can be simplified. In one example, the lookup table 500 can include two columns: a first column 501 includes a sequence of pixel SD values, and a second column 502 includes a sequence of pixel variance values. In one example, the pixel SD values are in a range from 0 to 40, and labeled with numerals 521-527. The pixel variance values are labeled with numerals 511-516. Each of the pixel variance values 511-516 corresponds to a pixel SD value 521-526, respectively.

Particularly, each pixel variance value in column 502 is an average of square values (variances) of two successive pixel SD values in column 501. For example, the pixel variance value 511 equals an average of square values of the pixel SD values 521 and 522. Thus, the pixel variance value 511 is a value of the expression, (0^2+1^2)/2, which is shown at the place of the pixel variance value 511. Similarly, the pixel variance value 512 equals an average of square values of the pixel SD values 522 and 523. Thus, the pixel variance value 512 is a value of the expression, (1^2+2^2)/2, which is shown at the place of the pixel variance value 512. In a similar way, the pixel variance values 513-516 can be calculated. It is noted that the expressions for calculating averages of square values of pixel SD values are shown in column 502 in FIG. 5 for explanation purpose, and are not part of the lookup table 500. Instead, the results of each expression are contained in column 502 in various examples.

When a pixel variance for a patch group is obtained, by searching the lookup table 500, an estimated pixel SD value can be determined. For example, when a pixel variance is smaller than the pixel variance value 511, the pixel SD value 521 can be used as the estimated pixel SD value. When a pixel variance is between a range between the pixel variances 511 and 512, the pixel SD value 522 can be used as the estimated pixel SD value. As can be seen, when a value of a pixel variance falls between two neighboring pixel variances, a pixel SD, a square value (variance) of which falls within a range between the two neighboring pixel variance, can be determined to be the respective estimated pixel SD. For a pixel variance that is larger than the last pixel variance 516, the last pixel SD 527 can be used as the respective estimated pixel SD.

In one example, searching for an estimated pixel SD in the lookup table 500 corresponding to an obtained pixel variance can be performed in the following way. First, searching in the sequence of pixel variances in the column 502 from the smallest variance 511 until a pixel variance that is greater than the obtained pixel variance is found. Second, a pixel SD in the sequence of the pixel SDs in column 501 corresponding to the found pixel variance (e.g., at the same row in the lookup table 500) can be determined to be the estimated pixel SD.

It is noted that in various examples, structures of the lookup table 500 can be different from what is shown in FIG. 5. For example, the sequence in column 501 or 502 can be ordered differently. Accordingly, specific searching algorithms can be adapted to be suitable for the respective orders of the lookup table 500.

In some examples, the lookup table 500 can be constructed before performing patch group denoising operations. In one example, a range and a precision of the pixel SDs in the lookup table 500 is first defined in order to construct the lookup table 500. For example, when a compression noise model is formulated based on experiments, a range and a precision of patch group pixel SDs can be determined accordingly. For example, based on statistic characteristics of reconstructed pictures, compression noise levels derived from the noise model can be limited to a certain range. Precisions of the compression noise levels can also be considered and determined. As a result, the compression noise model can have a certain level of accuracy high enough to achieve a target non-local denoising processing performance and at the same time respective processing cost can be controlled to be within a certain level. According to the compression noise model and respective range and precision, the range and precision of patch group pixel SDs can be defined.

For example, a range of patch group pixel SDs can be defined to be 0-10, 0-40, or 0-100 for a pixel depth of 8 bits corresponding to different reconstructed pictures in different examples. For example, a precision of patch group pixel SDs can be 2 binary bits after a binary point. Accordingly, for patch group pixel SDs in a range of 0-40, there can be 160 pixel SD values in column 501 in the lookup table 500. For example, the 160 pixel SD values in binary format can be 0.00, 0.01, 0.10, 0.11, 1.00, 1.01, 1.10, 1.11, . . . , 101000.11.

Accordingly, in one example, a process for constructing of a patch group pixel SD lookup table can include the following steps. First, a range and a precision of the pixel SDs can be determined. Second, a sequence of pixel SD values can be determined according to the determined range and precision of the pixel SDs. Third, a sequence of pixel variances can be determined according to the determined pixel SDs. For example, each of the pixel variances can be an average of square values of two successive pixel SDs.

FIG. 6 shows a second example patch group pixel SD lookup table 600 according to an embodiment of the disclosure. The lookup table 600 can include a sequence of pixel variance values 611-616 in a column 602, for example, from 0 to 1600, and a sequence of pixel SD values 621-626 in a column 601. Particularly, in each row of the lookup table 600, a pixel SD value takes a square root of a pixel variance value in the same row. For example, the pixel SD 623 takes a square root of the pixel variance 613. While the square root operation expressions are shown in column 601, the square root operation expressions are not part of the lookup table 600. Results of the square root operations are contained in column 601 of the lookup table 600 in various examples.

The lookup table 600 can be constructed in a way different from the lookup table 500. For example, in a process for creating the lookup table 600, the pixel variances in column 602 can first be determined. For example, a range of the pixel SDs in column 601 can first be defined in a way similar to the FIG. 5 example. Accordingly, a range of the respective pixel variances can be defined. For example, if a range of the pixel SDs is from 0 to 40, the range of the corresponding pixel variances can be from 0 to 1600. Based on the range of the pixel variances, a sequence of pixel variances can be created. For example, in FIG. 6, a precision corresponding to integer pixel variance values are adopted, and the sequence in column 602 can include 1601 values corresponding to the range of 0-1600. Accordingly, when calculating pixel variances of patch groups, the same integer precision can be adopted. In other words, results of calculating pixel variances of patch groups can be rounded to integer values to be consistent with the to-be-used lookup table 600.

After the pixel variances in column 602 are determined, the pixel SDs in column 601 can be determined by performing square root operations to respective pixel variances. For example, the pixel SD 624 can be determined to be $\sqrt{3} \approx 1.7$.

When searching the lookup table 600, a calculated pixel variance for a patch group can be used. When a pixel variance matching the calculated pixel variance is found in column 602, a pixel SD in the same row can be determined to be the target pixel SD that can be used in a compression noise model for estimating a compression noise level.

Comparing the lookup table 600 with the lookup table 500, the lookup table 500 is created based on pixel SDs, and pixel variances within a range are mapped to one pixel SDs. However, the lookup table 600 is created based on pixel variances, and one pixel variance is mapped with one pixel SD. The lookup table 600 can potentially have a larger size than the lookup table 500 corresponding to a same application.

Aspects of the disclosure provide example methods for simplifying calculation of weighting factors, for example, performed at S410 in FIG. 4 example. At S410, a weighting factor of a reference patch with respect to a current patch in a patch group can be derived based on the expression, $$w_{i,j} = e^{-(ASSE/Var)}.$$

In the above expression, ASSE represents an average of a sum of square errors between pixel values in the reference patch and the current patch; noise Var represents a compression noise level in the patch group. Various methods can be employed to simplify calculation of the term ASSE/Var.

In one example, a division operation 1/Var in the term ASSE/Var is replaced with a division lookup table searching operation represented as $LUT_1[Var]$. Accordingly, the calculation of ASSE/Var is transformed as shown below, $$ASSE/Var \rightarrow ASSE \times LUT_1[Var].$$

In the division lookup table searching operation, a search is performed in a first division lookup table that stores a sequence of values of 1/Var each mapped with a value of Var.

In the above example, a range of values of Var can be large. For example, the range of Var values can be from 0 to 60,000. As a result, a size of the first division lookup table can be large. In order to reduce the lookup table size, in one example, a dynamic right shift operation is performed to Var to obtain K number of most significant bits (K-MSBs) of the Var where K is a preconfigured number. Then, a second division lookup table can be utilized to determine a value of 1/K-MSBs based on the obtained K-MSBs.

For example, a Var value can be obtained from a compression noise model, and have a length of 10 binary bits represented as L. The number K is configured to be 4. Accordingly, in one example, the Var can be right shifted by $N_x$ bits until K most significant bits are left. In this example, a number of the right shifted bits equals L−K=10−4=6 bits. As for different patch groups, the noise variance Var can vary, the to-be-shifted bits number $N_x$ can accordingly vary.

The second division lookup table can store a sequence of values of 1/K−MSBs each corresponding to a K−MSB in another sequence in the second division lookup table. Searching in the second division lookup table can be based on a K−MSB. Compared with the first division lookup table, a size of the second division look up table is determined by the number of K, thus being decreased.

Corresponding to the $N_x$ bits right shifting operation performed on the Var (the denominator of the term ASSE/Var), the numerator ASSE can be similarly right shifted $N_x$ bits to maintain a proper value of the ASSE/Var. Accordingly, the transformation of calculation of ASSE/Var based on the second division lookup table can be represented as follows, $$ASSE/Var \rightarrow (ASSE \gg N_x) \times (LUT_2[Var \gg N_x]),$$

where $\gg$ represents a right shift operation, and $LUT_2[Var \gg N_x]$ represents a lookup operation performed in the second lookup table with a noise variance, Var, right shifted by $N_x$ bits.

In the above example, the values of 1/K−MSBs can be small because a value of a K−MSB can be a large integer. To reduce cost associated with storing and calculating with the small values of 1/K−MSBs, in one example, the second division lookup table is modified resulting a third division lookup table. Specifically, the third division lookup table can store values of $2^M$/K−MSBs where M is a preconfigured integer number. In this way, corresponding to a K−MSB, an exaggerated value that is $2^M$ times of the 1/K−MSB can be located. The exaggerated value, $2^M$/K−MSBs, can be more suitable for storing or manipulating compared with the value of 1/K-MSB, leading to higher processing efficiency.

Corresponding to the exaggeration operation in the third division lookup table, a resulting value can be right shifted for M bits to obtain a proper value of a respective ASSE/Var. Accordingly, the calculation of ASSE/Var with the third division lookup table can be represented as follows, $$\text{ASSE/Var} \to ((\text{ASSE} \gg N_x) \times (\text{LUT}_3[\text{Var} \gg N_d])) \gg M,$$

where $\text{LUT}_3[\text{Var} \gg N_x]$ represents a lookup operation performed in the third lookup table with a noise variance, Var, right shifted by $N_x$ bits.

In some examples, rounding offsets can be applied to further improve accuracy of calculating the term ASSE/Var. For example, before performing a right shifting to a noise variance Var, a rounding offset can be added to Var. For example, a value of the rounding offset can take $(1 \ll N_x)/2$ where $\ll$ represents a left shift operation. In various examples, a value of the rounding offset can be in a range from 0 to $(1 \ll N_x)-1$. Similarly, a rounding offset can be added to the value of ASSE or $((\text{ASSE} \gg N_x) \times (\text{LUT}_3[\text{Var} \gg N_x]))$ before performing a respective right shifting operation. In addition, rounding offsets can be used to one or multiple of the following terms: ASSE, Var, or $((\text{ASSE} \gg N_x) \times (\text{LUT}_3[\text{Var} \gg N_x]))$ for one denoising process. Different choices regarding which term(s) to apply rounding offsets can be selected for difference video sequences, reconstructed pictures, or patch groups in various examples.

Figure 7:
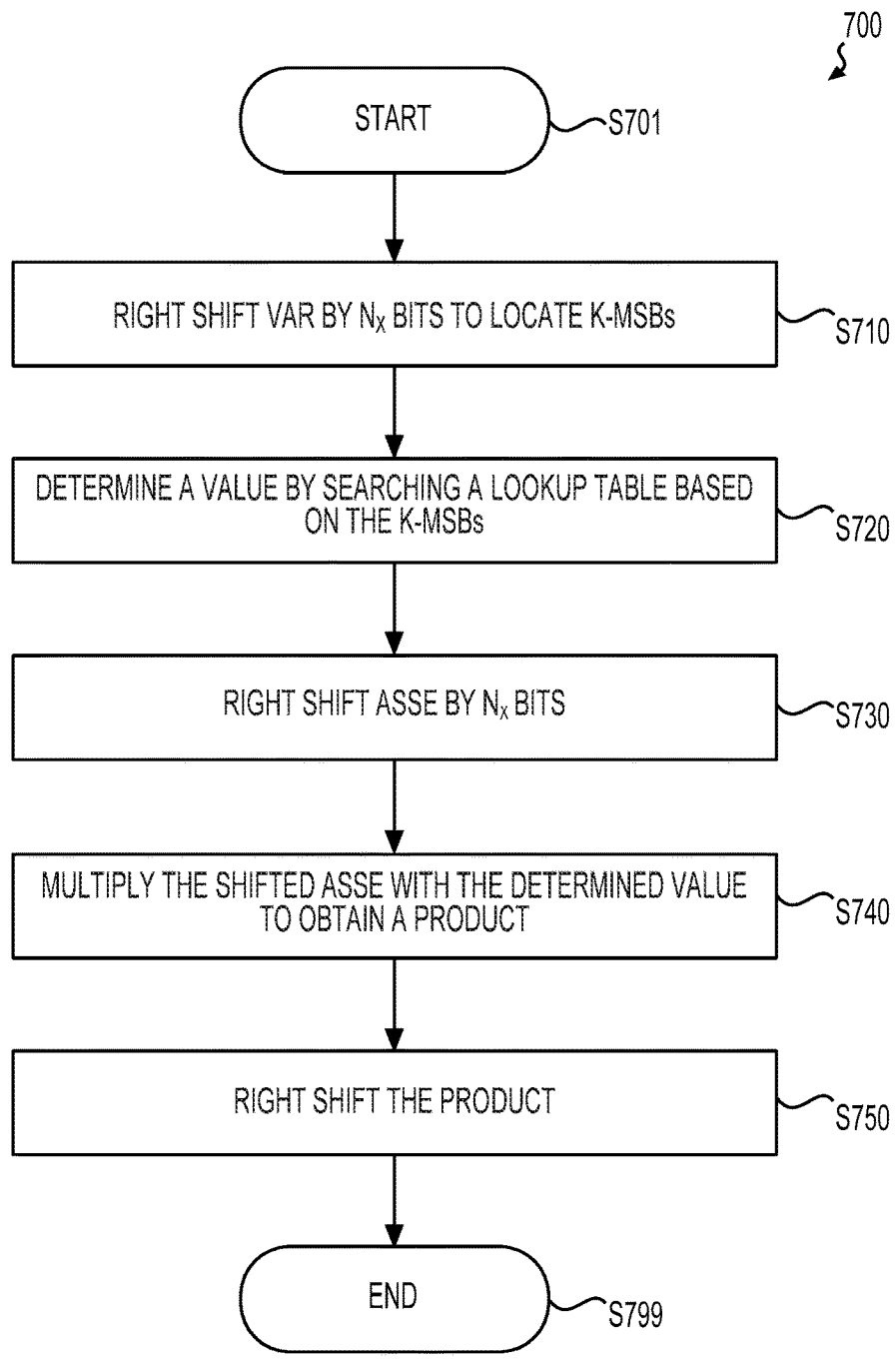
FIG. 7 shows a process for calculating a term ASSE/Var using the third division lookup table according to an embodiment of the disclosure.

As an example, FIG. 7 shows a process 700 for calculating a term ASSE/Var using the third division lookup table according to an embodiment of the disclosure. The process 700 can start from S701, and proceed to S710.

At S710, the Var can be right shifted by $N_x$ bits to locate K number of most significant bits (K-MSBs).

At S720, a value of 2^M/K-MSBs can be determined by searching the third division lookup table based on the located K-MSBs.

At S730, the ASSE can be right shifted by $N_x$ bits.

At S740, the right-shifted ASSE can be multiplied with the determined value of 2^M/K-MSBs to obtain a product.

At S750, the product can be right shifted by M bits to obtain the target ASSE/Var value. The process 700 can then proceed to S799, and terminate at S799.

Aspects of the disclosure provide example methods for simplifying normalization operations performed on accumulated pixel values, for example, at S450 in FIG. 4 example. At S450, accumulated pixel values in an accumulation picture are normalized to obtain a filtered picture. For example, an accumulated pixel, represented as $X_A$, can include multiple portions of pixel values, and each of the portions corresponds to an original pixel value of either a current patch or a reference patch multiplied by a gain. Each gain corresponds to a weighting factor, or a product of one or more weighting factors. Accordingly, an accumulated pixel can be divided by a sum of those gains (represented as $S_G$) to obtain a normalized pixel value, $X_A/S_G$. The division operation in $X_A/S_G$ can be simplified to increase efficiency of patch group processing.

Figure 8:
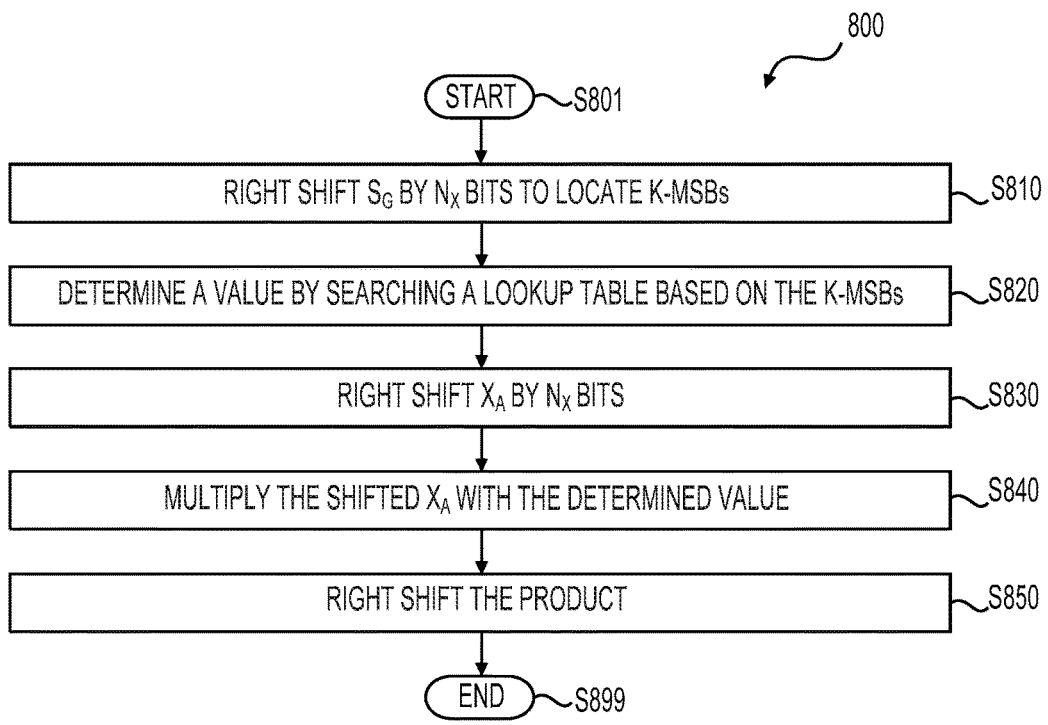
FIG. 8 shows a process for calculating a term $X_A/S_G$ according to an embodiment of the disclosure.

In one example, calculation of the term $X_A/S_G$ can be performed in a way similar to calculation of ASSE/Var with lookup tables similar to the first, second, or third division lookup table. As an example, FIG. 8 shows a process 800 for calculating $X_A/S_G$ according to an embodiment of the disclosure. The process 800 can start with S801, and proceed to S810.

At S810, the sum of the gains $S_G$ can be right shifted by $N_x$ bits to locate K number of most significant bits (K-MSBs).

At S820, a value of 2^M/K-MSBs can be determined by searching a lookup table similar to the third division lookup table described above based on the located K-MSBs.

At S830, the $X_A$ can be right shifted by $N_x$ bits.

At S840, the right-shifted $X_A$ can be multiplied with the determined value of 2^M/K-MSBs to obtain a product.

At S850, the product can be right shifted by M bits to obtain a normalized pixel value. The process 800 can then proceed to S899, and terminate at S899.

Figure 9:
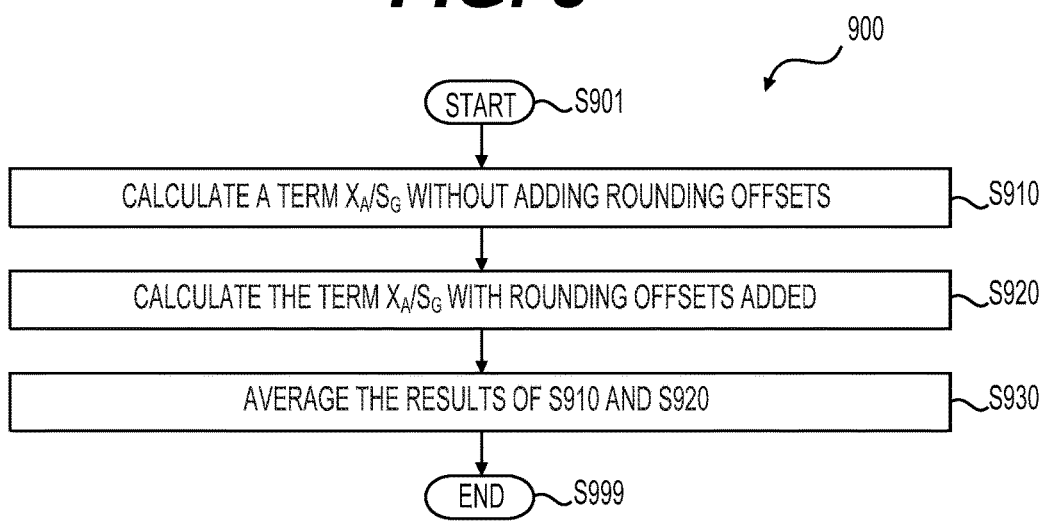
FIG. 9 shows a process with rounding offset operations according to an embodiment of the disclosure.

In various examples, rounding offsets can be applied to improve accuracy of calculation of the term $X_A/S_G$. As an example, FIG. 9 shows a process 900 with rounding offset operations according to an embodiment of the disclosure. The process 900 can start at S901, and proceed to S910.

At S910, the term $X_A/S_G$ can first be calculated without adding rounding offsets, for example, using a lookup table similar to the second or third division lookup table described herein.

At S920, the term $X_A/S_G$ can be calculated with rounding offsets added using the same lookup table as in the first step. Specifically, the rounding offsets can be added to one or multiple of the following terms: $X_A$, $S_G$, and $((X_A \gg N_x) \times (\text{LUT}_3[S_G \gg N_x]))$. For example, the rounding offsets can be added to $X_A$ or $S_G$, or both.

At S930, results of the first and second steps are averaged, and the averaged value is used as a target value of the term $X_A/S_G$. The process 900 can then proceed to S999, and terminate at S999.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:
1. A method, comprising:
  receiving reconstructed video data corresponding to a picture;
  dividing the picture into current patches;
  forming patch groups each including a current patch and a number of reference patches that are similar to the current patch;
  determining a noise level for each of the patch groups, including:
    calculating a pixel variance of pixel values for a respective patch group,
    determining a pixel standard deviation (SD) of the respective patch group according to the calculated pixel variance for the respective patch group by searching in a first lookup table that indicates mapping relationship between patch group pixel SDs and patch group pixel variances, and
    calculating a noise level for the respective patch group based on a compression noise model that is a function of the pixel SD of the respective patch group; and
  denoising the patch groups with a non-local denoising technology to create a filtered picture based on the determined compression noise level of each of the patch groups.

2. The method of claim 1, wherein the first lookup table includes a first sequence of patch group pixel SDs, and a second sequence of patch group pixel variances,
wherein an average value between square values of each pair of two successive patch group SDs forms the second sequence of patch group variances.

3. The method of claim 2, wherein the searching in the first lookup table includes:
searching for a range defined by two successive average values in the second sequence that includes the pixel variance for the respective patch group; and
determining a patch group SD in the first sequence to be the pixel SD of the respective patch group, wherein a square value of the determined patch group SD is included in the same range defined by the two successive average values in the second sequence.

4. The method of claim 2, further comprising:
constructing the first lookup table, including,
determining a range of the first sequence of patch group SDs,
determining a precision of the first sequence of patch group SDs, and
determining the first sequence of patch group SDs according to the determined range and precision.

5. The method of claim 1, wherein the first lookup table includes a first sequence of patch group SDs, and a second sequence of patch group variances,
wherein each of the first sequence of patch group SDs is an SD of one of the second sequence of patch group variances.

6. The method of claim 5, wherein searching in the first lookup table includes:
finding a patch group variance in the second sequence that is equal to the pixel variance for the respective patch group; and
determining one of the first sequence of patch group SDs corresponding to the found patch group variance of the second sequence to be the pixel SD of the respective patch group.

7. The method of claim 1, wherein the non-local denoising technology is one of:
a non-local means (NLM) denoising technology,
a block matching and 3D filtering (BM3D) denoising technology, or
a low-rank approximation (LRA) denoising technology.

8. The method of claim 1, wherein denoising the patch groups with the non-local denoising technology to create the filtered picture based on the determined compression noise level of each of the patch groups includes:
calculating an ASSE/Var value to be used for calculating a weighting factor of a reference patch with respect to a current patch, ASSE being an average of a sum of square errors between the reference patch and the current patch, Var being a noise variance that is a square of a noise level of a patch group that includes the reference patch and the current patch,
wherein calculating the ASSE/Var value includes,
right shifting the Var by $N_x$ bits to locate K number of most significant bits (K-MSBs), K being a preconfigured number,
determining a value of $2^M$/K-MSBs by searching a second lookup table based on the located K-MSBs, M being a preconfigured number,
right shifting the ASSE by $N_x$ bits,
multiplying the right-shifted ASSE with the determined value of $2^M$/K-MSBs to obtain a product, and
right shifting the product by M bits to obtain the ASSE/Var value.

9. The method of claim 8, wherein the second lookup table indicates mapping relationship between a sequence of values of $2^M$/K-MSBs and a sequence of K-MSBs each having K number of bits.

10. The method of claim 8, further comprising one of:
adding a rounding offset to the Var before right shifting the Var by $N_x$ bits;
adding a rounding offset to the ASSE before right shifting the ASSE by $N_x$ bits; and
adding a rounding offset to the product before right shifting the product by M bits.

11. The method of claim 1, wherein denoising the patch groups with the non-local denoising technology to create the filtered picture based on the determined compression noise level of each of the patch groups includes:
calculating a normalized pixel value corresponding to an accumulated pixel value $X_A$ that includes multiple portions of pixel values, each of the portions corresponding to an original pixel value of the divided picture multiplied by a gain, wherein calculating the normalized pixel value includes,
(a) right shifting a sum of the gains, $S_G$, corresponding to the accumulated pixel value $X_A$ by $N_x$ bits to locate K number of most significant bits (K-MSBs), K being a preconfigured number,
(b) determining a value of $2^M$/K-MSBs by searching a third lookup table based on the located K-MSBs, M being a preconfigured number,
(c) right shifting the $X_A$ by $N_x$ bits,
(d) multiplying the right-shifted $X_A$ with the determined value of $2^M$/K-MSBs to obtain a product, and
(e) right shifting the product by M bits to obtain a first normalized pixel value.

12. The method of claim 11, wherein the third lookup table indicates mapping relationship between a sequence of values of $2^M$/K-MSBs and a sequence of K-MSBs each having K number of bits.

13. The method of claim 11, wherein calculating the normalized pixel value further includes:
performing steps of (a)-(e) with a rounding offset operation to obtain a second normalized pixel value, the rounding offset operation including at least one of,
adding a rounding offset to the $S_G$ before right shifting the $S_G$ by $N_x$ bits,
adding a rounding offset to the $X_A$ before right shifting the $X_A$ by $N_x$ bits, or
adding a rounding offset to the product before right shifting the product by M bits; and
averaging the first and second normalized pixel values to obtain the calculated normalized pixel value.

14. A non-local adaptive loop filter, comprising circuitry configured to:
receive reconstructed video data corresponding to a picture;
divide the picture into current patches;
form patch groups each including a current patch and a number of reference patches that are similar to the current patch;
determine a noise level for each of the patch groups, wherein determining the noise level includes:
calculating a pixel variance of pixel values for a respective patch group,
determining a pixel standard deviation (SD) of the respective patch group according to the calculated pixel variance for the respective patch group by searching in a first lookup table that indicates mapping relationship between patch group pixel SDs and patch group pixel variances, and calculating a noise level for the respective patch group based on a compression noise model that is a function of the pixel SD of the respective patch group; and denoise the patch groups with a non-local denoising technology to create a filtered picture based on the determined compression noise level of each of the patch groups.

15. The non-local adaptive loop filter of claim 14, wherein the first lookup table includes a first sequence of patch group pixel SDs, and a second sequence of patch group pixel variances, wherein an average value between square values of each pair of two successive patch group SDs forms the second sequence of patch group variances.

16. The non-local adaptive loop filter of claim 14, wherein the first lookup table includes a first sequence of patch group SDs, and a second sequence of patch group variances, wherein each of the first sequence of patch group SDs is an SD of one of the second sequence of patch group variances.

17. The non-local adaptive loop filter of claim 14, wherein the circuitry is further configured to:

calculate an ASSE/Var value to be used for calculating a weighting factor of a reference patch with respect to a current patch, ASSE being an average of a sum of square errors between the reference patch and the current patch, Var being a noise variance that is a square of a noise level of a patch group that includes the reference patch and the current patch, wherein calculating the ASSE/Var value includes,
right shifting the Var by $N_x$ bits to locate K number of most significant bits (K-MSBs), K being a preconfigured number,
determining a value of $2^{\wedge}M/K$-MSBs by searching a second lookup table based on the located K-MSBs, M being a preconfigured number,
right shifting the ASSE by $N_x$ bits,
multiplying the right-shifted ASSE with the determined value of $2^{\wedge}M/K$-MSBs to obtain a product, and
right shifting the product by M bits to obtain the ASSE/Var value.

18. The non-local adaptive loop filter of claim 14, wherein the circuitry is further configured to:

calculate a normalized pixel value corresponding to an accumulated pixel value $X_A$ that includes multiple portions of pixel values, each of the portions corresponding to an original pixel value of the divided picture multiplied by a gain, wherein calculating the normalized pixel value includes,
(a) right shifting a sum of the gains, $S_G$, corresponding to the accumulated pixel value $X_A$ by $N_x$ bits to locate K number of most significant bits (K-MSBs), K being a preconfigured number,
(b) determining a value of $2^{\wedge}M/K$-MSBs by searching a third lookup table based on the located K-MSBs, M being a preconfigured number,
(c) right shifting the $X_A$ by $N_x$ bits,
(d) multiplying the right-shifted $X_A$ with the determined value of $2^{\wedge}M/K$-MSBs to obtain a product, and
(e) right shifting the product by M bits to obtain a first normalized pixel value.

19. The non-local adaptive loop filter of claim 18, wherein the circuitry is further configured to:

perform steps of (a)-(e) with a rounding offset operation to obtain a second normalized pixel value, the rounding offset operation including at least one of,
adding a rounding offset to the $S_G$ before right shifting the $S_G$ by Nx bits,
adding a rounding offset to the $X_A$ before right shifting the $X_A$ by Nx bits, or
adding a rounding offset to the product before right shifting the product by M bits; and
average the first and second normalized pixel values to obtain the calculated normalized pixel value.

20. A non-volatile computer-readable medium storing instructions that, when executed by a processor, cause the processor to perform a method, the method comprising:

receiving reconstructed video data corresponding to a picture;
dividing the picture into current patches;
forming patch groups each including a current patch and a number of reference patches that are similar to the current patch;
determining a noise level for each of the patch groups, including:
calculating a pixel variance of pixel values for a respective patch group,
determining a pixel standard deviation (SD) of the respective patch group according to the calculated pixel variance for the respective patch group by searching in a first lookup table that indicates mapping relationship between patch group pixel SDs and patch group pixel variances, and
calculating a noise level for the respective patch group based on a compression noise model that is a function of the pixel SD of the respective patch group; and
denoising the patch groups with a non-local denoising technology to create a filtered picture based on the determined compression noise level of each of the patch groups.

* * * * *